United States Patent [19]

Benassi

[11] 4,335,887
[45] Jun. 22, 1982

[54] SEALING DEVICE FOR USE WITH FLEXIBLE DYNAMOMETRIC BARS

[75] Inventor: GianCarlo Benassi, Modena, Italy

[73] Assignee: Fiat Trattori S.p.A., Modena, Italy

[21] Appl. No.: 199,132

[22] Filed: Oct. 22, 1980

[30] Foreign Application Priority Data

Nov. 14, 1979 [IT]   Italy .............................. 53743/79[U]

[51] Int. Cl.³ .......................... F16J 15/32; F16J 15/38
[52] U.S. Cl. ........................................ 277/84; 277/92;
   277/95; 277/153; 277/165; 277/166; 277/208
[58] Field of Search ...................... 277/84, 85, 92, 95,
   277/152, 153, 165, 208, 166, DIG. 6; 172/7;
   280/405 B

[56] References Cited

U.S. PATENT DOCUMENTS

| | | | |
|---|---|---|---|
| 3,022,081 | 2/1962 | Kosatka | 277/84 X |
| 3,086,781 | 4/1963 | Hudson et al. | 277/84 X |
| 3,601,417 | 8/1971 | Szepesvary | 277/165 |
| 3,770,284 | 11/1973 | Galloway | 277/92 |
| 3,980,309 | 9/1976 | Dechavanne | 277/165 X |
| 4,083,567 | 4/1978 | Thumm | 277/153 X |

Primary Examiner—Robert S. Ward, Jr.
Attorney, Agent, or Firm—Sughrue, Mion, Zinn, Macpeak & Seas

[57] ABSTRACT

A sealing device for a flexible dynamometric bar associated with a hydraulic power-lift of an agricultural tractor comprises an elastomer sealing ring formed in one piece by a collar element which surrounds the bar, and a bell-shaped element, which coaxially surrounds the collar element. The collar element is provided with a pair of internal circumferential sealing lips which, having diameters smaller than that of the bar, are deformed when fitted to the latter to ensure an effective seal. Sealing is also ensured by a pair of resilient metal rings which press the collar element against the bar. The elastomer of the sealing ring has an additive of graphite or laminar cleavage salts to reduce the friction which results from sliding between the bar and the lips, during deformation of the bar in use.

12 Claims, 3 Drawing Figures

SEALING DEVICE FOR USE WITH FLEXIBLE DYNAMOMETRIC BARS

The present invention relates to a sealing device for use with flexible dynamometric bars.

More particularly, the invention is concerned with a sealing device of the type used with a flexible bar which has a central portion extending between two supports and two circular-section end portions which project beyond the supports, a respective said sealing device being fitted in correspondence with each of the end portions to separate from the exterior a lubricated internal environment housing the central portion of the flexible bar.

A sealing device of the aforesaid type may be used particularly with a flexible dynamometric bar associated with the hydraulic power-lift of the implement linkage of an agricultural tractor.

It has already been proposed for example, in U.S. application Ser. No. 037,084, filed May 8, 1979, now U.S. Pat. No. 4,289,208, to use, in agricultural tractors, a flexible dynamometric bar which is supported in a transverse horizontal position by two supports on a fixed structure of the tractor, and is connected at its ends to two arms forming part of the implement linkage of the tractor. The flexible bar is connected by a mechanical transmission to means controlling the operation of the hydraulic power-lift of the tractor, so that the power-lift is operated when the deformation of the flexible bar resulting from the reaction force transmitted from the ground to the agricultural implement carried by the two arms exceeds a predetermined value. This structure enables operation of the hydraulic power-lift by so-called "controlled stress", that is, the agricultural implement carried by the tractor is raised automatically relative to the ground every time the force transmitted from the ground to the implement exceeds the predetermined value.

The central portion of the flexible dynamometric bar, between the two supports, is housed in a lubricated cavity made in the fixed structure of the tractor and, in devices of this type, the cavity is separated from the exterior by a sealing device carried by the fixed structure in correspondence with each end portion of the bar. This sealing device must afford effective sealing between the cavity and the exterior, while permitting those displacements of the flexible bar relative to the fixed structure of the tractor which occur when an agricultural implement is in operation on the ground.

Each sealing device is located on a part of the flexible bar which is situated externally of the central portion between the two supports. During deformation of the flexible bar, therefore, that part of the bar carrying the sealing device rotates about an axis which intersects perpendicularly the axis of the bar in correspondence with that support which is closer to the sealing device. This means that the displacement of that part of the flexible bar mounting the sealing device represents a total of three displacements:

(a) a radial displacement perpendicular to the axis of the bar;

(b) an axial displacement parallel to the axis of the bar, and (c) local rotation about an axis which intersects perpendicularly the axis of the bar in correspondence with the part on which the sealing device is fitted.

The sealing device must be capable, therefore, of permitting the radial displacement and local rotation of the bar, and relative sliding between the sealing device and the bar during the axial displacement.

According to one known example, the sealing device comprises a flat ring of a material with a low friction coefficient (which has its internal surface in contact with the surface of the flexible bar when fitted thereto), and a sealing ring of elastomer material which surrounds the flat ring and which, when fitted, is compressed radially between the external surface of the flat ring and a seating for the sealing device which, being machined in the fixed structure of the tractor, ensures sealing. The flat ring of low friction coefficient material allows axial sliding between the flexible bar and the sealing device when the bar deforms, and the ring of elastomer material is capable of such deformation that radial displacement and local rotation may take place following deformation of the bar. This solution, however, does not enable satisfactory results to be obtained, especially since the resistance of the elastomer material tends to result in the phenomena of relaxation under force and "creep".

The object of the present invention is to provide a sealing device of the above specified type which enables the aforesaid drawbacks to be avoided.

Accordingly, the present invention provides a sealing device of the aforesaid type, characterised in that the sealing device comprises a sealing ring having a unitary body of elastomer material which includes a collar element provided at the ends of its inner surface with respective internal circumferential sealing lips, the free edges of which have diameters less than that of the flexible bar, and a bell-shaped element surrounding the collar element coaxially and being integral therewith at an attachment end corresponding to one end of the collar element remote from the central portion of the bar, the bell-shaped element extending towards the other end of the collar element and being radially spaced therefrom to cooperate with a seating of the sealing ring to effect a seal therebetween, the sealing ring having resilient means which compress the collar element against the surface of the flexible bar when the sealing ring is fitted thereto.

In known devices sealing is achieved by radial compression of the elastomer seal between the surface of the flexible bar and the seating. In a sealing device according to the present invention, however, sealing of the bar is ensured in two ways: firstly, the free edges of the lips have a smaller diameter than the bar when the seal is underformed and, secondly, the resilient means compress the collar against the bar. By virtue of these characteristics, the drawbacks of the prior art are eliminated. The sealing ring of the device of the present invention is capable of deformation which, when the bar is deformed, permits radial displacement and local rotation of that part of the bar on which the sealing device is fitted. During deformation of the bar, the circumferential lips slide along its surface as a result of the aforementioned axial displacement of that part of the bar to which the device is fitted.

In order to reduce the friction between the lips and the surface of the bar, the body of the sealing ring is preferably formed of a linear-chain lactone polyester polyurethane elastomer with an additive of graphite or laminar cleavage salts such as molybdenum or tungsten disulpide, niobium or zinc diselenide, or boron nitrite.

One embodiment of the present invention will now be more particularly described, by way of example, with reference to the accompanying drawings, in which.

Figure 1:
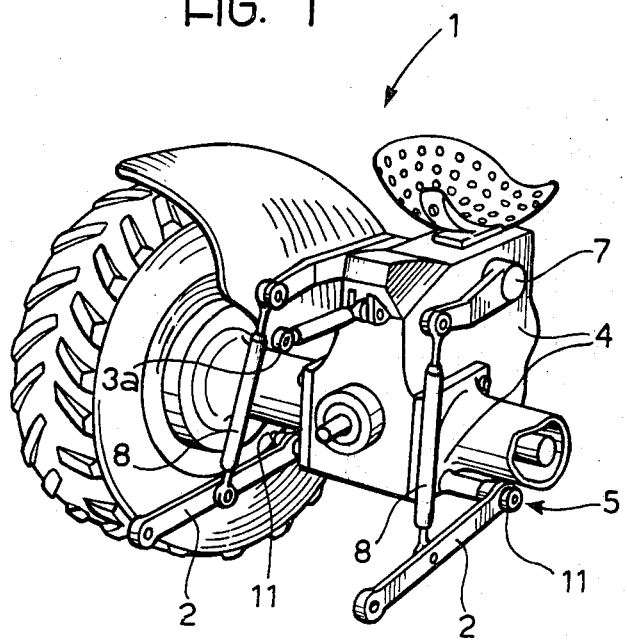
FIG. 1 is a perspective view of the rear portion of an agricultural tractor.
Figure 2:
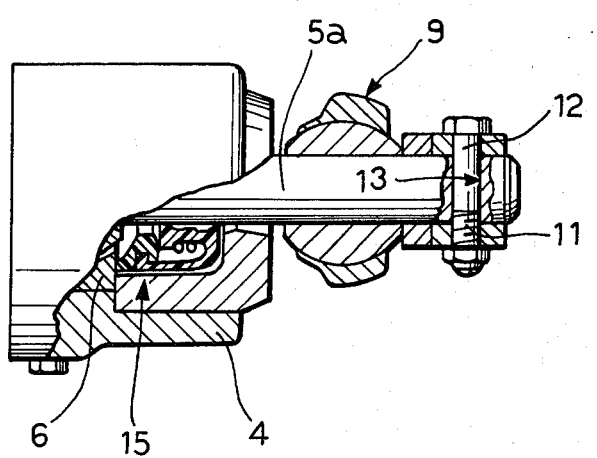
FIG. 2 is a partial cross-section of a detail of FIG. 1 showing a sealing device according to the present invention in its position of use.
Figure 3:
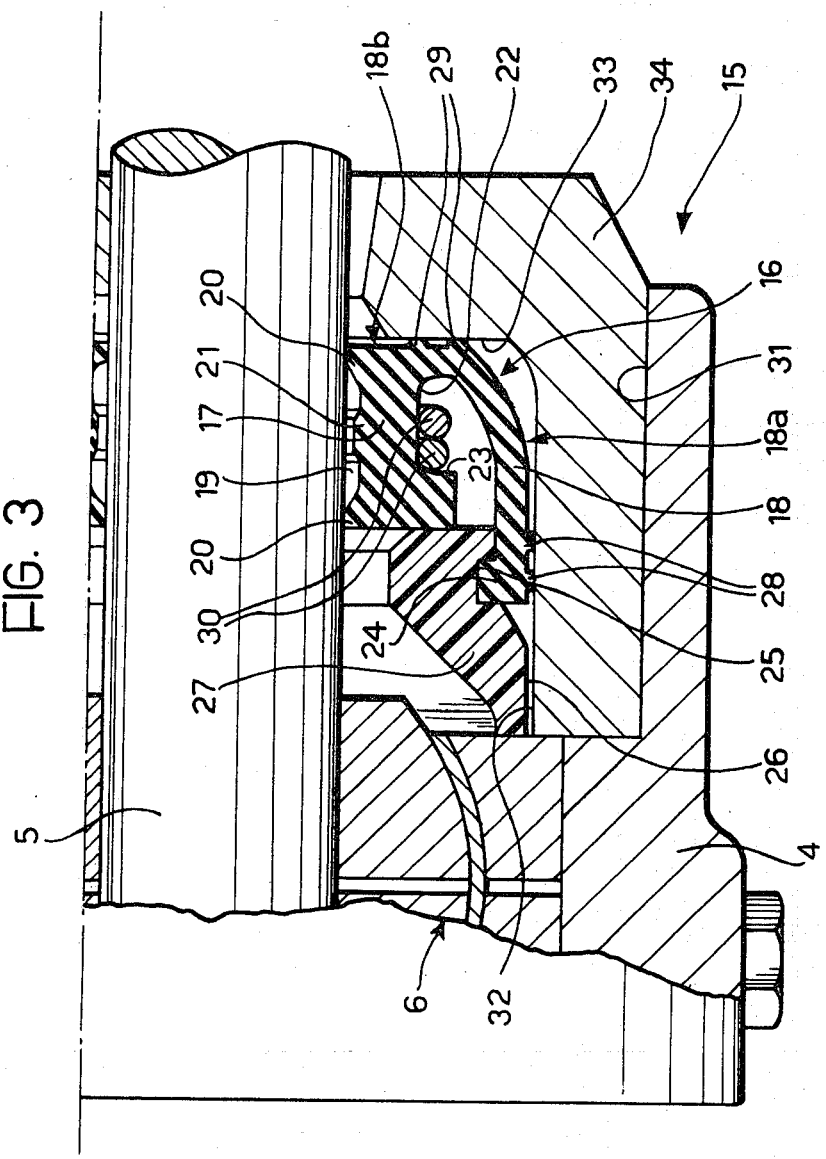
FIG. 3 is a detail of FIG. 2 on an enlarged scale showing the sealing device of the present invention.

In FIG. 1, there is shown an agricultural tractor 1 provided with a known three-point linkage comprising two lower arms 2 and an upper arm 3. The upper arm 3 is articulated at one end to the fixed structure 4 of the tractor 1 and is provided at its other end with a coupling 3a for hitching an agricultural implement. Each of the lower arms 2 is articulated at its forward end to a flexible dynamometric bar 5 which is supported on the fixed structure 4 of the tractor 1 by two spherical supports 6, one of which is shown in FIGS. 2 and 3. The flexible dynamometric bar 5 has a central portion, which is located between the two supports 6 within a lubricated cavity (not shown) in the fixed structure of the tractor, and two end portions 5a, which project beyond the supports 6. The forward end of each of the lower arms 2 is articulated to a respective end portion 5a of the bar 5 by a ball joint 9 which, as shown in FIG. 2, is retained on the bar 5 by a respective locking sleeve 11 fixed to the end of the bar by a bolt 12 which engages in a diametric hole 13 in the bar. The lower arms 2 are connected to respective tie-rods 8 articulated at their upper ends to the arms of a hydraulic power-lift 7.

The flexible bar 5 is connected by a known mechanical transmission (not shown) to a conventional hydraulic distributor (not shown) which controls the operation of the hydraulic power-lift 7. During operation, when the deformation of the flexible bar 5 resulting from the reaction force transmitted from the ground through the implement to the lower arms 2 exceeds a predetermined value, the mechanical transmission acts on the hydraulic distributor to activate the hydraulic power-lift 7.

FIGS. 2 and 3 show a sealing device, generally indicated 15, which is carried by the fixed structure 4 of the tractor in correspondence with each of the end portions 5a of the flexible bar 5, to separate the lubricated cavity housing the central portion of the bar 5 from the exterior. The sealing device 15 comprises a sealing ring 16 having a body of elastomer material which includes, in one piece, a collar element 17 and a bell-shaped element 18.

The collar element 17 has, at each end of its inner surface 19, an internal circumferential sealing lip 20 which is in contact with the surface of flexible bar 5 when the sealing device 15 is fitted. The free edge of each sealing lip 20 has a diameter which is less than that of the bar 5 when the sealing ring 16 is undeformed. The inner surface 19 also has a radially inwardly projecting part 21 which is axially equidistant from the two lips 20. The outer surface 22 of the collar element 17 includes an annular shoulder 23 which lies in a plane perpendicular to the axis of the sealing ring 16. Arranged on the outer surface 22, between the shoulder 23 and the attachment end of the bell-shaped element 18 on the collar element 17, are two metal rings 30 formed by respective rods wound spirally in opposite senses to each other. These rings 30 act as resilient means for pressing the collar element 17 against the surface of the flexible bar 5.

The bell-shaped element 18 surrounds the collar element coaxially, and extends from the end of the collar element 17 nearer the free end of the bar 5 towards the spherical support 6. The free end edge of the bell-shaped element 18 has a radially inwardly projecting circumferential beading 24 which is engaged in a cooperating groove 25 in the external surface 26 of a ring element 27 of plastics material interposed axially between the sealing ring 16 and the support 6 to act as a spacer element. The bell-shaped element 18 has an outer radial surface 18a with two circumferential sealing lips 28, and an outer axial end face 18b with two concentric, axially-projecting peripheral sealing lips 29.

The sealing lips 28,29 cooperate with the internal surface of a seating for the sealing ring 16, which is machined in a metal element 34 force-fitted in a seating 31 which, in turn, is machined in the fixed structure 4 of the tractor. The metal element 34 is in the form of a bush and the internal surface comprises a cylindrical wall portion 32 which is coaxial with the sealing ring 16, and an annular wall portion 33 which lies in a plane perpendicular to the axis of the sealing ring 16.

The sealing of the lips 20 on the flexible bar 5 is not ensured by the fact that the sealing ring 16 is compressed radially between the bar 5 and the cylindrical portion 32 of the seating when the device 15 is fitted. The lips 20 ensure sealing by virtue of the fact that they are deformed when the collar element 17 is fitted onto the flexible bar 5, and that the metal rings 30 press the collar element 17 against the bar. In this manner the drawbacks of the prior art are avoided.

The material forming the sealing ring 16 is preferably a linear-chain lactone polyester polyurethane elastomer with an additive of graphite or laminar cleavage salts, such as molybdenum or tungsten disulphide, niobium or zinc diselenide, or boron nitride, so that the axial sliding which occurs between the flexible bar 5 and the sealing lips 20 during deformation of the bar does not damage the sealing ring.

Preferably, the ring element 27 is made from a polyoxymethylene polymer having a higher modulus of elasticity than the elastomer material forming the sealing ring 16.

What is claimed is:

1. In a flexible bar mounting arrangement including: a pair of supports; a central portion of said bar extending between said supports in a lubricated environment, and a pair of circular-section end portions of said bar projecting beyond said supports, a sealing device, including a seating, which is fitted to each said end portion to separate said lubricated central portion from the exterior, wherein the improvement consists in said sealing device including an elastomer sealing ring comprising:

a collar element having inner and outer surfaces;

respective internal circumferential sealing lips located at the ends of said collar element on its inner surface, said lips having free edge diameters less than the external diameter of said bar;

a bell-shaped element surrounding said collar element coaxially and being integral therewith at an attachment end corresponding to one said end of said collar element remote from said central portion of said bar, said bell-shaped element extending towards the other end of said collar element and being radially spaced therefrom to cooperate with said seating and effect a seal therebetween, and resilient means for compressing said collar element against the surface of said flexible bar when said sealing ring is fitted thereto.

2. Sealing device as defined in claim 1, wherein said sealing device further includes an annular plastics element adapted to be interposed axially between said sealing ring and said bar support adjacent said sealing ring so as to act as a spacing element, said annular element being provided with a circumferential groove on its external surface, and said bell-shaped element being provided on its free end edge with a radially inwardly projecting circumferential beading which engages said circumferential groove.

3. Sealing device as defined in claim 1, wherein said bell-shaped element has at least one circumferential sealing lip adjacent said free end edge of its external surface, said lip cooperating with a portion of said seating.

4. Sealing device as defined in claim 1, wherein said bell-shaped element has an outer axial end face adjacent said attachment end, said end face is provided with at least one axially projecting peripheral sealing lip which lies in a plane perpendicular to the axis of the sealing ring, and said seating includes an annular wall which is perpendicular to said axis and cooperates with said sealing lip.

5. Sealing device as defined in claim 1, wherein said resilient means comprise at least one metal ring constituted by a spirally wound rod fitted on said outer surface of said collar element.

6. Sealing device as defined in claim 1, wherein said resilient means comprise two metal rings which are formed by rods wound spirally in opposite senses to each other, and are fitted on said outer surface of said collar element.

7. Sealing device as defined in claim 6, wherein said external surface of said collar element includes an annular shoulder remote from said attachment end of said bell-shaped element, and wherein said metal rings are arranged on said surface between said shoulder and said attachment end.

8. Sealing device as defined in claim 1, wherein said inner surface of said collar element has a radially inwardly projecting part axially equidistant from said sealing lips.

9. Sealing device as defined in claim 4, wherein said sealing device includes a metal bush which is fixed relative to said flexible bar and coaxially surrounds said sealing ring, said bush having an internal surface which forms said seating for said sealing ring.

10. Sealing device as defined in claim 1, wherein said sealing ring is formed from a linear-chain lactone polyester polyurethane elastomer with a graphite additive.

11. Sealing device as defined in claim 1, wherein said sealing ring is formed from a linear-chain lactone polyester polyurethane elastomer with an additive of laminar cleavage salts.

12. Sealing device as defined in claim 2, wherein said annular plastics element is formed from a polyoxymethylene polymer having a higher modulus of elasticity than the elastomer material forming said sealing ring.

* * * * *